US005345552A

United States Patent [19]

Brown

[11] Patent Number: 5,345,552

[45] Date of Patent: Sep. 6, 1994

[54] CONTROL FOR COMPUTER WINDOWING DISPLAY

[75] Inventor: James C. Brown, Mequon, Wis.

[73] Assignee: Marquette Electronics, Inc., Milwaukee, Wis.

[21] Appl. No.: 975,436

[22] Filed: Nov. 12, 1992

[51] Int. Cl.[5] .............. G06F 15/62

[52] U.S. Cl. .............. 395/157; 345/119; 345/123

[58] Field of Search .............. 395/157; 340/721, 724; 345/56, 115, 116, 118, 119, 121, 123, 124, 125

[56] References Cited

U.S. PATENT DOCUMENTS

| | | | |
|---|---|---|---|
| 4,225,929 | 9/1980 | Ikeda | 395/157 |
| 4,386,410 | 5/1983 | Pandya et al. | 395/157 |
| 4,412,294 | 10/1983 | Watts et al. | 395/157 |
| 4,574,364 | 3/1986 | Tabata et al. | 395/157 |
| 4,618,858 | 10/1986 | Belch | 340/724 |
| 4,653,020 | 3/1987 | Cheselka et al. | 395/157 |
| 4,694,288 | 9/1987 | Harada | 340/721 |
| 4,769,762 | 9/1988 | Tsujido | 395/157 |
| 4,780,710 | 10/1988 | Tatsumi | 340/721 |
| 4,816,812 | 3/1989 | Iida | 345/115 |
| 4,860,218 | 8/1989 | Sleator | 395/157 |
| 4,890,257 | 12/1989 | Anthias et al. | 345/119 |
| 4,903,013 | 2/1990 | Takeda | 345/123 |
| 5,057,825 | 10/1991 | Fujii | 345/118 |
| 5,061,919 | 10/1991 | Watkins | 345/115 |
| 5,124,691 | 6/1992 | Sakamoto et al. | 340/721 |
| 5,262,764 | 11/1993 | Inamori et al. | 345/115 |
| 5,266,932 | 11/1993 | Tokumitsu | 345/123 |
| 5,276,437 | 1/1994 | Horvath et al. | 345/119 |

*Primary Examiner*—Heather R. Herndon
*Assistant Examiner*—N. Kenneth Burraston
*Attorney, Agent, or Firm*—Michael, Best & Friedrich

[57] ABSTRACT

A windowing control for a video display includes a programmed controller, a video display including a screen and a raster for scanning the screen, a first memory having a first area for storing data to be displayed in a first window defined on the screen and a second area for storing data to be displayed in a second window on the screen and a second memory for storing the addresses of the data to be displayed in the first and second windows and the transitions between the windows. The controller includes a processor programmed to load data into the first and second memory means and a memory controller for initiating the transfer of data from the first and second memory to a pixel multiplexer. The processor is also programmed to load new address data into the second memory means for each complete raster scan so that the position of the data within the window has the appearance of horizontal (panning) or vertical (scrolling) movement.

29 Claims, 5 Drawing Sheets

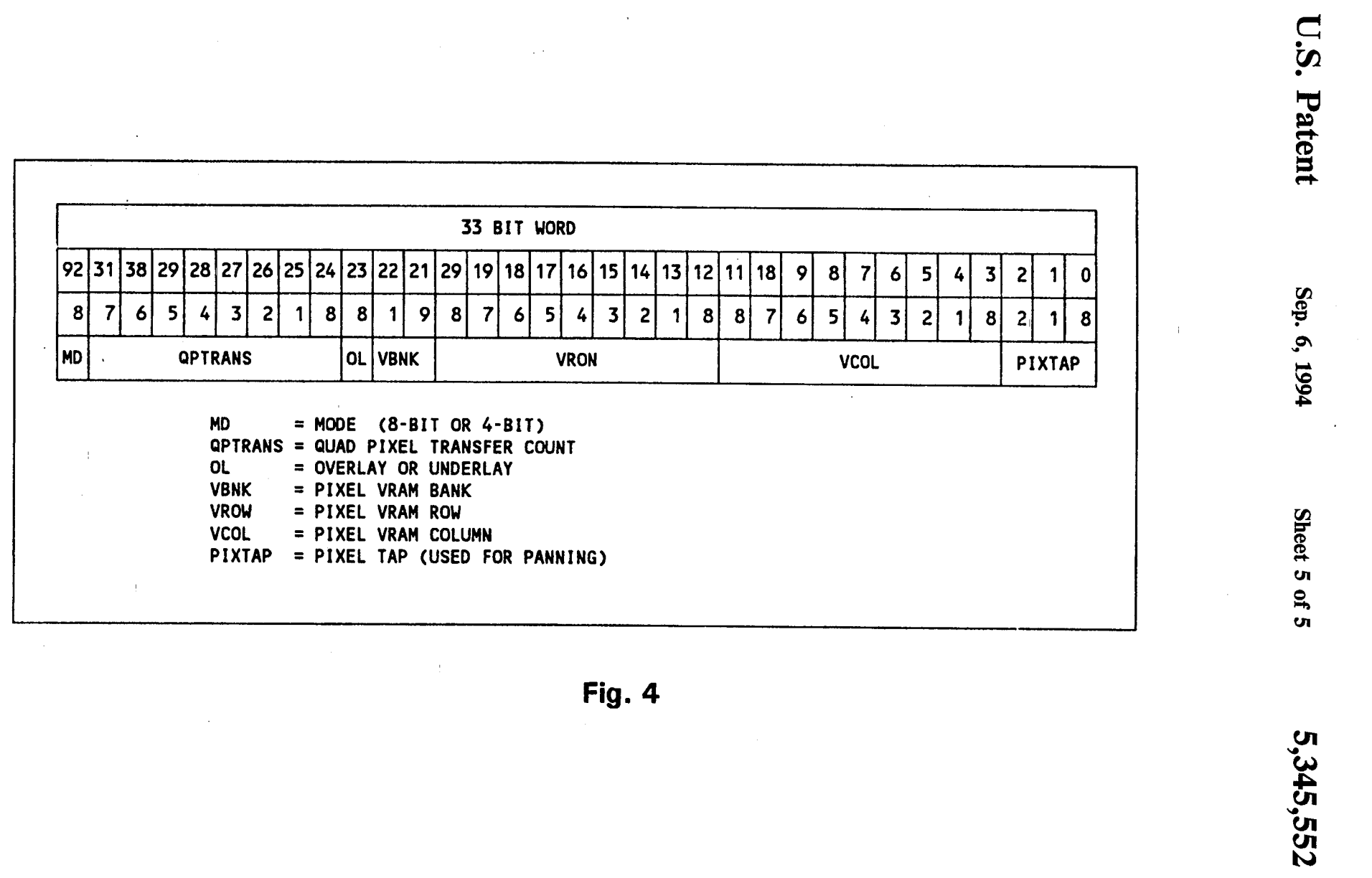

| 33 BIT WORD | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 92 | 31 | 38 | 29 | 28 | 27 | 26 | 25 | 24 | 23 | 22 | 21 | 29 | 19 | 18 | 17 | 16 | 15 | 14 | 13 | 12 | 11 | 18 | 9 | 8 | 7 | 6 | 5 | 4 | 3 | 2 | 1 | 0 |
| 8 | 7 | 6 | 5 | 4 | 3 | 2 | 1 | 8 | 8 | 1 | 9 | 8 | 7 | 6 | 5 | 4 | 3 | 2 | 1 | 8 | 8 | 7 | 6 | 5 | 4 | 3 | 2 | 1 | 8 | 2 | 1 | 8 |
| MD | QPTRANS | | | | | | | | OL | VBNK | | VRON | | | | | | | | | VCOL | | | | | | | | | PIXTAP | | |

MD = MODE (8-BIT OR 4-BIT)
QPTRANS = QUAD PIXEL TRANSFER COUNT
OL = OVERLAY OR UNDERLAY
VBNK = PIXEL VRAM BANK
VROW = PIXEL VRAM ROW
VCOL = PIXEL VRAM COLUMN
PIXTAP = PIXEL TAP (USED FOR PANNING)

Fig. 4

CONTROL FOR COMPUTER WINDOWING DISPLAY

BACKGROUND OF THE INVENTION

This invention relates to a computer windowing control and more particularly to a control for multiple, independently scrolling and panning windows.

Windowing provides the appearance of several displays in a single video display monitor. In some applications, it is desirable to independently scroll and/or pan alphanumerics and graphics independently in computer monitor displays. For example, in cardiac monitoring and diagnosis, it is desirable to display multiple ECG signals and other physiological data in multiple windows and to pan or scroll this data to provide medical personnel information on a real time or delayed basis, as required.

At the present, windowing at typical work stations or personal computers is often accomplished by having the processor write data for different windows to different locations in a video random access memory (VRAM). When the VRAM data is displayed sequentially, that is, line after line on the raster display, the windows appear on a video monitor exactly as they were written into the VRAM.

Current methods and apparatus for scrolling and panning in video display windows have several limitations. For example, to obtain the effect of panning or scrolling data on the screen, it is necessary for the processor to either rewrite all of the VRAM memory or sequence through the VRAM memory start addresses for each raster line. If the processor rewrites all of the VRAM data, a substantial burden is imposed on the processor. If the VRAM start addresses for each raster line are sequenced, then panning or scrolling is limited to a single speed for the entire display and individual window panning or scrolling cannot normally be accomplished. Moreover, when a new window is drawn or windows are moved on the display, it is necessary for the processor to rewrite many or all of the locations in the VRAM for the new display format. This requires many processor machine states to execute and reduces the time remaining for other processor functions. In addition, the display update time may be so slow as to detract from the efficiency of the system, since the user may have to wait for the display to be updated. This would be especially evident if the processor is reopening a window that contains graphical information, since the new data must be read from the display random access memory (DRAM), processed and written to the VRAM for display.

SUMMARY OF THE INVENTION

It is an object of the invention to provide a new and improved windowing method for controlling multiple, independent scrolling and panning windows in a computer monitor display.

Another object of the invention is to provide a windowing control for computer monitor displays which permits more than one panning or scrolling window with different panning or scrolling rates to be displayed simultaneously.

Still another object of the invention is to provide a windowing control for computer monitor displays which facilitates dynamic window opening, closing, re-sizing, and repositioning on the display.

A further object of the invention is to provide a windowing control for computer monitor displays wherein the transition from an existing display format to a new display format occurs on the next succeeding vertical trace through the raster sequence.

A still further object of the invention is to provide a panning control for computer monitor displays which employs multiple VRAM pixel planes to allow the collection of real-time video data for a hidden or non-displayed or partially hidden window.

Yet another object of the invention is to provide a computer monitor display windowing control method and apparatus which minimizes processor burden due to window management.

It is another object of the invention to provide a computer monitor display windowing method and apparatus wherein it is not required to redraw the new video data into a single raster display area in order to draw a new window.

Yet a further object of the invention is to provide a computer monitor display windowing control method and apparatus which provides more precise control over the panning motion of the display.

These and other objects and advantages of the invention will become more apparent from the detailed description thereof taken with the accompanying drawings.

According to one aspect, the invention comprises a windowing control for a video display having raster means and raster scanning means, the windowing control including programmed control means, first memory means for storing data to be displayed in at least one window defined on the raster means, second memory means for storing the addresses of the data to be displayed in the at least one window, the control means being programmed to load data to be displayed into the first memory means and to initiate the transfer of data from the first memory means to the display and to write new address data into the second memory means for each complete raster scan by the raster scanning means whereby the position of the data within the at least one window has the appearance of horizontal or vertical displacement.

According to another aspect, the invention comprises a windowing control for a video display having raster means and raster scanning means, the windowing control including programmed control means, first memory means for storing data to be displayed in a first window defined on the raster means at a first location and for storing data to be displayed in a second window defined on the raster means at a second location, second memory means for storing the addresses of the data to be displayed in the first and second windows, the control means being programmed to load data to be displayed in the first window in the first area of the first memory means and to load data to be displayed in the second window in the second area of the first memory means and for loading into the second memory means the address of the data to be displayed in the first and second windows, and to initiate the transfer of data from the area of the first memory means for display in the first window in accordance with the address thereof in the second memory means, and for transitioning to the second area of the memory for display in the second window in accordance to the address thereof in the second memory means, and to write new address data into the second memory means whereby the position of the data within the at least one window has the appearance of horizontal or vertical displacement.

According to a further aspect, the invention comprises a windowing control for a video display having raster means and raster scanning means, the windowing control including programmed control means, first memory means having a first area for storing data to be displayed in a first window defined on the raster means and a second area for storing data to be displayed in a second area of the raster means, second memory means for storing the addresses of the data to be displayed in the first and second windows and the addresses of the transition between the windows, the control means being programmed to load data to be displayed into the first memory means and to initiate the transfer of data from the first memory means to the display and to write new address data into the second memory means as the data is being displayed.

According yet to another aspect, the invention comprises the method of controlling the display of data in windows on a raster, including the steps of loading image data to be displayed into first memory means, clearing previously stored addresses from a second means, loading new addresses for the data into the second memory means, transferring data to be displayed in the window from the first memory means to raster scanning means, displaying the data on the raster in accordance with addresses stored in the second memory means, completing the vertical trace of the raster, clearing the second memory means, loading new addresses into the second memory means after the completion of the vertical raster trace, and initiating the transfer of data from the first memory means for display according to new addresses stored in the second memory means so that there is the appearance of relatively movement of the data within the window in which it is displayed.

According to another aspect, the invention comprises the method of controlling the display of data in windows on a raster means, including the steps of loading image data to be displayed in a first window in the raster means into a first area of a first memory means and data to be displayed in a second window in a second area of the first memory means, loading addresses for the data to be displayed in the first and second windows into a second memory means, transferring data to be displayed in the first window from the first area of the first memory means to raster means, displaying the data in a first window in the raster means in accordance with addresses thereof stored in the second memory means, transitioning from the data stored in the first area of the first memory means to the data stored in the second area of the first memory means, displaying the data from the second area of the first memory means in a second window in the raster means in accordance with the addresses thereof in the second memory means.

BRIEF DESCRIPTION OF THE DRAWINGS

FIG. 4 shows the word format for the address of the windows and window transitions.

DETAILED DESCRIPTION OF THE PREFERRED EMBODIMENT

Figure 1:
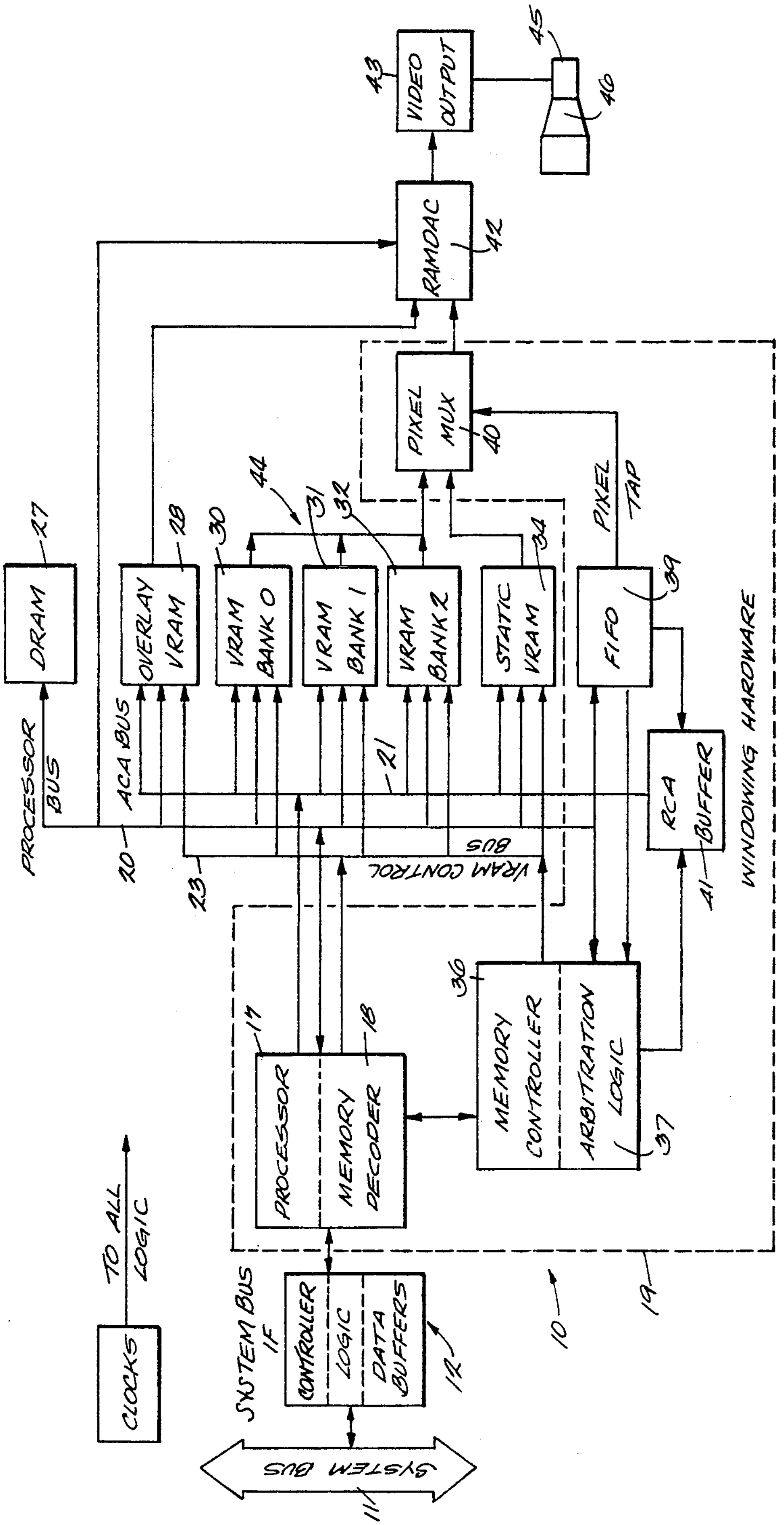
FIG. 1 is a block diagram schematically illustrating the preferred embodiment of the invention.

FIG. 1 shows a block diagram illustrating a hardware implementation according to the preferred embodiment of the invention. More particularly, the hardware includes a video control 10 coupled to the system bus 11 by a system bus interface 12. The system bus interface 12 includes a controller 13, a logic module 14, and data buffers 15. The video control 10 includes a processor 17, a memory decoder 18 and a windowing control 19. The processor 17 is coupled to the bus interface 12 for receiving the data to be displayed and to a processor bus 20, a row column address (RCA) bus 21, and a video RAM (VRAM) control bus 23. The memory decoder 18 is connected to the windowing control 19 and to the processor bus 20 and a video RAM (VRAM) control bus 23. Also connected to the processor bus 20 is a DRAM program memory 27, an overlay video RAM 28, video RAM bank∅ 30 (VRAM BANK∅), video RAM bank1 31 (VRAM BANK1), video RAM bank2 32 (VRAM BANK2), and a static video RAM 34.

The windowing control 19 also includes a memory controller module 36, and arbitration logic module 37 (ARBT), a first-in-first-out memory (FIFO) 39, a pixel multiplexer 40 (PIXEL MUX) and an RCA buffer 41. The memory controller module 36 is connected to the memory decoder 18, the VRAM control bus 23 and the arbitration logic 37. The memory controller 36 and the ARBT 37 are connected to the processor bus 20, the FIFO 39 and the RCA buffer 41. The FIFO 39 is also connected to the PIXEL MUX 40 and to each of the VRAMs 28, 30, 31 and 32 through the RCA buffer 41 and the RCA bus 21. The VRAMs 28, 30, 31, 32 and 34 are each connected to the processor bus 20 for receiving data to be displayed, to the RCA bus 21 for receiving address signals and to the VRAM control bus 23 for receiving control signals. The outputs of the video RAMs 28, 30, 31, 32 and 34 and the FIFO 39 are all connected to the PIXEL MUX 40. The PIXEL MUX 40 and the overlay VRAM are connected to a random access memory and digital-to-analog convertor block 42 (RAMDAC), which provides a video output to the display 43. Clock signals are provided to the processor 17, the controller 36 and ARBT module 37, the PIXEL MUX 40 and the RAMDAC.

The processor 17 loads data to be displayed into the VRAMs 28, 30, 31, 32 and 34 and loads the VRAM addresses into the FIFO 39. The memory decoder 18 is a fixed logic module that enables the processor 17 to address the other blocks. The memory controller 36 is controlled by the data that is loaded into the FIFO 39.

The video RAMs 28, 30, 31, 32 and 34 are random access memories and include serial registers. These store video data and operate when enabled to transfer a row of data serially in response to clock pulses to the output register for serial transfer to the PIXEL MUX 40. The addresses of the data to be transferred from the video RAMS 28, 30, 31 and 32 to the PIXEL MUX are stored in the FIFO 39. Storing the window transition addresses in the FIFO 39 frees the processor 17 from the necessity of performing the VRAM memory to register transfers in real time. The borders of the windows can be stored in the static VRAM 34 or the overlay VRAM 28. The DRAM program memory 27 provides memory for the processor program.

The memory controller 36 performs the video RAM memory to serial register transfers by instructing the video RAMs 28, 30, 31, 32 and 34 to transfer a row of data into their respective serial output registers. The VRAM output is enabled from a VRAM address stored in the FIFO 39 subsequent to or during the last VRAM memory to serial register transfer. The memory controller 36 also controls the enable signals to the different banks of VRAMs 28, 30, 31, 32 and 34 as required. Specifically, the memory controller 36 uses the VRAM control bus and the RCA bus to instruct the appropriate VRAM to begin transferring data to its own serial register. When the memory controller 36 enables one VRAM, the previously active VRAM is disabled and the other VRAMs remain inactive so that only a single VRAM bank drives the VRAM bus 44 at any one time. Inputs to the memory controller 36 from the FIFO 39 are VRAM bank selection and the quad pixel transfer point (QPTRANS) which indicates the horizontal location for the next window transition. Output signals control the VRAMs and the overlay VRAM, the memory transfer signals to the VRAMs and the VRAM serial output signals.

Those skilled in the art will appreciate that the functions of the processor 17 and the memory controller 36 can be performed in a single processing unit. Accordingly, the processor 17 and the memory controller 36 can be considered as a control means programmed to load data to be displayed into the VRAMs 28, 30, 31 and 32 and to initiate the transfer of data to be displayed from the VRAMs and to write new address data into the FIFO 39. Also, the functions of the VRAMS may be performed by a single video RAM with sufficient capacity. Therefore, the VRAMs 30, 31 and 32 can be considered to be a first memory means for storing the data to be displayed and the FIFO 39 a second memory means for storing the addresses of the data to be displayed.

The arbitration logic 37 controls the acquisition of the processor bus 20, the VRAM control bus 23, and the RCA bus 21 by the processor 17 and the memory controller 36. In particular, the arbitration logic grants the processor bus 20, the VRAM control bus 23, and the RCA bus 21 to the memory controller 36 as soon as the processor allows the buses to be relinquished. The processor 17 uses the processor bus 20, the VRAM control bus 23 and the RCA bus 21 to access the video RAMs 28, 30, 31, 32 and 34, as well as its own program memory 27, which is used to run the program. If the processor 17 is driving the buses 20, 23 and 21, and the memory controller 37 requires the buses for a window transition or the commencement of a new line on the raster display, the memory controller 36 will signal the ARBT module 37 indicating that it is ready for bus control. The ARBT module 37 then signals the processor 17 to complete its operation. When the processor operation is completed, the memory controller 36 acquires bus control for the transfer of data from one bank of VRAM memory to its serial output register. After the memory transfer has been completed, the ARBT module 37 then grants bus control back to the processor 17.

Inputs to the ARBT module 37 include the quad-pixel transfer count for VRAM to memory transfers from the FIFO 39, the horizontal and vertical video sync and blanking signals, and the bus request from the processor 17. Logic signals provided by the arbitration logic 37 are bus control allocated to the processor 17 or bus control allocated to memory controller 36.

The ARBT module 37 uses a counter to track the raster scan position for each horizontal line on the display and compares this counter output to the quad-pixel transfer bits to determine when a VRAM memory to register transfer is needed. VRAM memory to register transfers are also initiated during the start of a horizontal blanking period. The arbitration logic uses the request for VRAM memory to serial register transfer and the bus request codes from the processor 17 to determine the master for the processor bus 20, the VRAM control bus 23 and the RCA bus 21. The bus requests may be high priority requests, access termination, low priority requests and no requests. The requests from the memory controller 36 may be memory transfer requests, and no memory transfer requests.

The pixel multiplexer 40 changes the position of the pixels on the screen. In particular, the PIXEL MUX 40 determines which pixels in the VRAMs will be mapped to specific pixels on the raster in fine-grained increments. In the preferred embodiment, each 8-bit byte stores one pixel of information so that there are four pixels for each 32-bit word. The PIXEL MUX 40 moves the data on the screen by zero, one, two, or three pixels to obtain a scrolling or panning effect in small increments so as to avoid jerky or rapid transitions. The outputs from the VRAMs are routed to the PIXEL MUX 40, which determines the position of each pixel on the screen as specified by the pixel rotation bits received from the last FIFO entry. The memory of the RAMDAC 42 includes a table which indicates the proportional intensity of the colors, red, green or blue, in which the data is to be displayed. The static VRAM 34 provides data which may be displayed on top of the dynamic plan of data. The overlay VRAM provides data which is displayed as an overlay on top of the dynamic plane of data being displayed from the VRAM banks 30, 31, 32 and 34, and would appear as borders or text on top of the VRAM data. The output of RAMDAC is then converted from digital to analog and provided to a video control 45 which drives raster scan display 46.

Figure 2C:
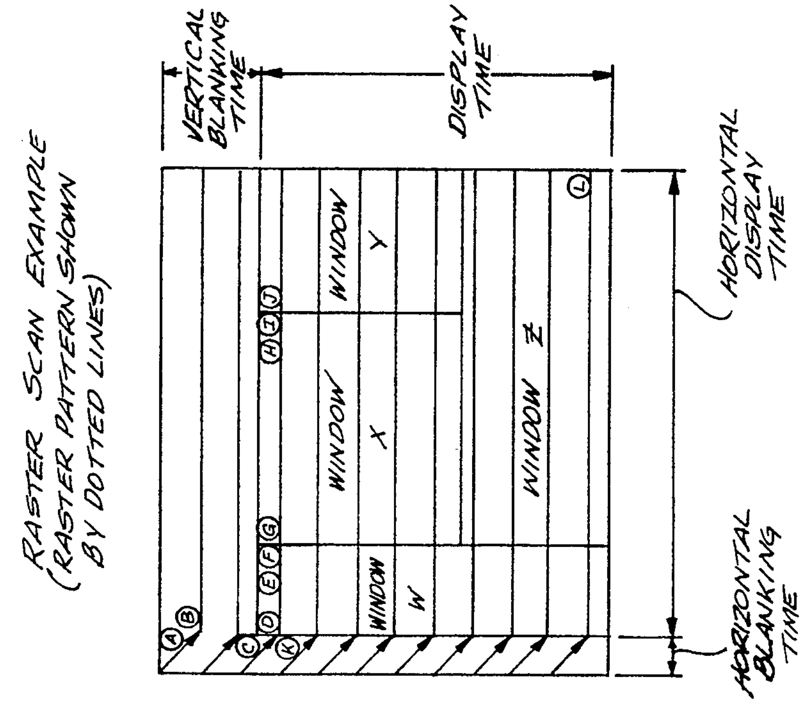
FIG. 2*c* is a raster scan example illustrating the method of FIG. 2*b*.
Figure 2A:
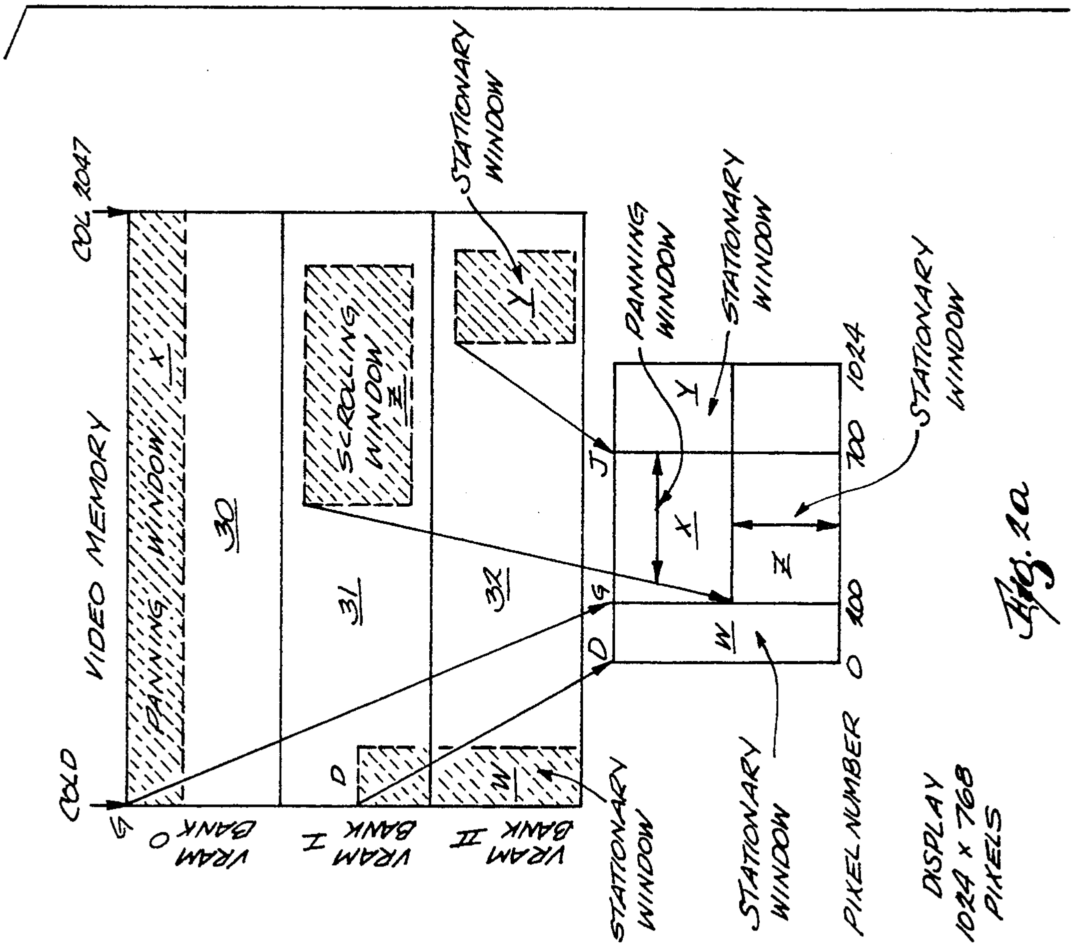
FIG. 2*a* schematically illustrates the relationship between the video random access memory and the video screen windows.
Figure 2B:
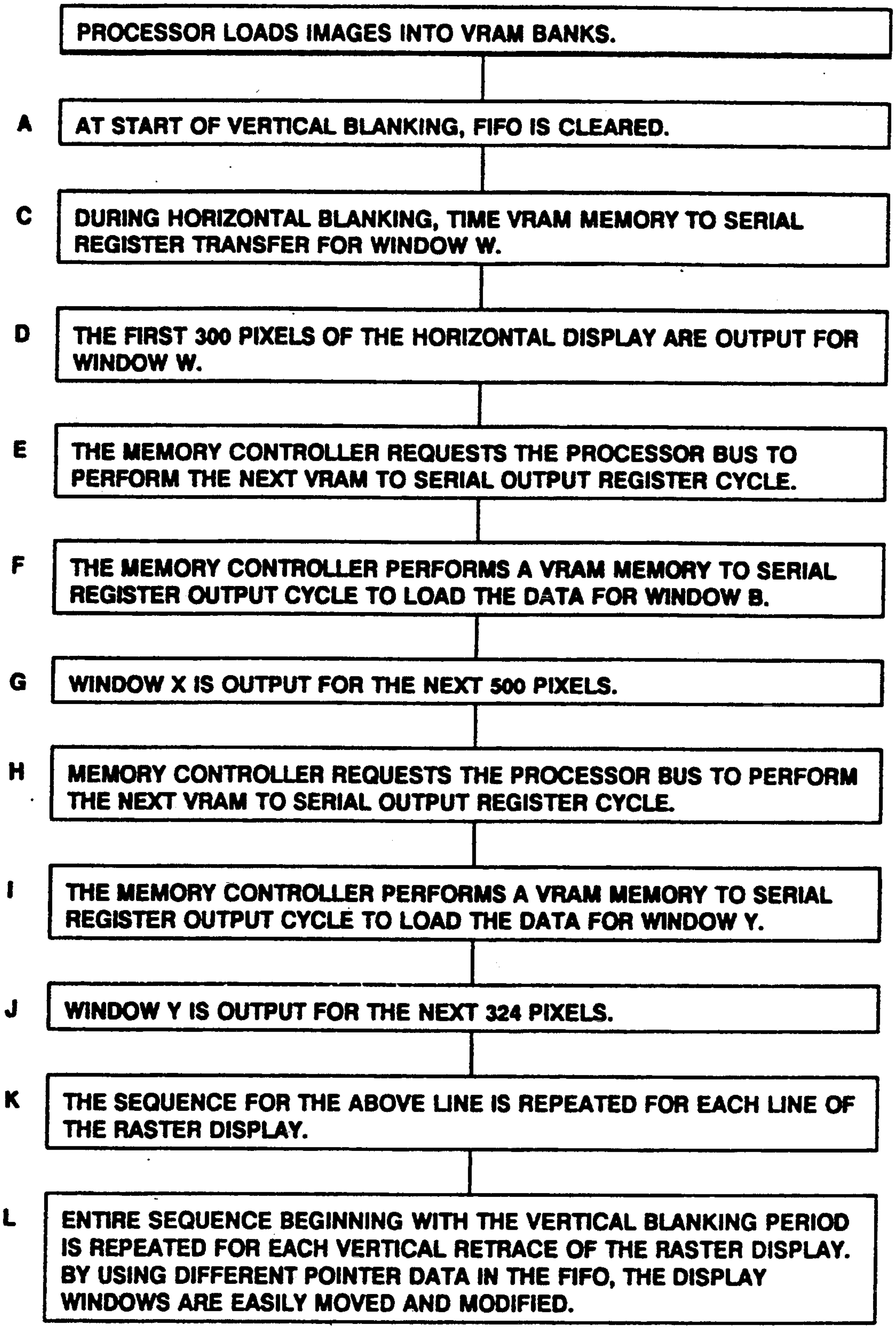
FIG. 2*b* is a flow chart illustrating the operation of the hardware illustrated schematically in FIG. 1.

FIGS. 2*a*, 2*b* and 2*c* illustrate the operation of the windowing system in accordance with the preferred embodiment of the invention. In particular, FIG. 2*a* illustrates the VRAM banks 30,31 and 32 and a typical window display in a video screen; FIG. 2*b* is an operational flow chart of the system; and FIG. 2*c* shows the raster scan pattern for the window display of FIG. 2*a*.

In FIG. 2*a*, the data stored in the VRAM banks is drawn to scale in units of square pixels. The video memory area is four times the video display area in this particular example so that more than one screen can be loaded into the VRAMs at any one time. The information shown on the display may come from any position in the VRAMs. In the example, the VRAMs are 512 rows by 512 columns, but since one 32-bit word of VRAM data contains four pixels with 8 bits per pixel, the diagram shows 2,048 columns. Also for purposes of illustration, the display includes a stationary window W, a panning window X, a stationary window Y, and a scrolling window Z. In the panning window X, the data or images being displayed appear to move horizontally, while in the scrolling window Z the data or images appear to move vertically. It will be appreciated that if desired, the data or images in either window could also appear to move diagonally. As the name suggests, in the stationary windows A and C, the data remains stationary. It will be understood that the number of windows, their relative sizes, and whether they are stationary, scrolling, or panning and the direction of movement is optional and is dependent upon the address information loaded into the FIFO 39. The data displayed in each window is dependent upon the data loaded into the VRAMs 28, 30, 31, 32 and 34. The processor 17 may load new data into the VRAMs 28, 30, 31, 32 and 34 at any time independent of the display raster scan pattern.

Operation commences when the processor 17 loads the data into the VRAM banks 30, 31, and 32. At the start of the vertical blanking signal A (FIG. 2*c*), the FIFO is reset by the memory controller 36 and an interrupt to the processor is generated. The processor must load at least two words into the FIFO before the end of the vertical sync signal portion which occurs during the vertical blanking time B. The remainder of the FIFO entries must be loaded before the FIFO output is required by the pixel MUX 40. During the horizontal blanking time C, the memory controller instructs the VRAM to commence memory to serial register transfer for window W. Subsequent VRAM memory to serial register transfers may occur at the start of horizontal blanking periods or at mid-line points as specified by the quad-pixel transfer count in the FIFO word.

FIFO status signals, FIFO empty, FIFO half-full, and FIFO full, are available to the memory controller 36 and the processor 17 to monitor the status of the FIFO. If a VRAM memory to serial register transfer is requested by the memory controller 36 with the FIFO empty, an error is generated and an interrupt generated to the processor 17. Other information available in the 32 bit FIFO word format is the pixel VRAM bank identifier, the pixel VRAM row, the pixel VRAM column, and pixel rotation bits, the 4/8 bit mode bit, the overlay/underlay bit, and the pixel quadrant count for mid-line scan reload.

In the illustrated example, the data for window W is stored in VRAM BANK1 from rows 255–511 and columns 0–200 and in VRAM BANK2 from rows 0–511 and columns 0–200. The address for the data of windows W, X, Y, and Z are loaded into the FIFO 39 during the vertical blanking time B.

The addresses for a memory to serial output register transfer for the VRAMs 30, 31 and 32 are read directly from the FIFO 39 and are buffered by the RCA buffer 41. The column address for a memory to register transfer for the static and overlay VRAMs is always zero or 256, while the row addresses for the static and overlay VRAMs is generated by a counter in the memory controller 36.

During the horizontal blanking time C, the data in the first 200 pixels of the horizontal display in VRAM BANK1 are shifted from the VRAM memory to the VRAM serial output register, so that the first line of pixels in stationary window W will be displayed beginning at the end of horizontal blanking, D. As the raster approaches point E, the memory controller 36 sees a value in the FIFO 39 which matches the transition between windows W and X, and requests the busses 20, 21 and 23 from the ARBT 37. The FIFO also indicates the location of the data for panning window X, which in the illustrated example is in VRAM BANKØ 30. When the raster nears the point F where window X is to begin, memory controller 36 performs the VRAM memory to serial register output for the first line of panning window X. When the raster reaches the point G where window X is to begin, memory controller 36 disables VRAM BANK1 and enables VRAM BANKØ. This transition from one address of the memory to another during active raster output is called mid-line scan reload. Such address transformations may occur within the same bank of VRAM or may be from one bank of VRAM to another. This permits multiple window transitions for each horizontal line of raster output. The memory controller 36 uses counters to keep track of the position of the raster on the display screen so that it can monitor and control window transitions. Window X is then output to the pixel MUX 40 for the next 500 pixels at step G. Just prior to the completion of the display of the data for the line of panning window X at step H, the memory controller requests the processor buses 20, 21 and 23. Then, near the completion of the line of window X at step I, the memory controller 36 performs a VRAM to serial register output cycle for the first line of stationary window Y. In the illustrated example, this data is stored in VRAM BANK2 and its address is indicated by the FIFO 39. This data is then transferred from the serial register to the multiplexer at column 700 and is displayed for the next 324 pixels beginning at step J. This sequence is repeated for each of the 768 rows of pixels in the display. It is necessary for the processor 17 to reload the FIFO 39 only once per vertical retrace.

In the panning window X, the pixel MUX 40 maps the data on the screen so that it is shifted horizontally. This transition is at the rate of zero, one, two, or three pixels for each raster scan. To produce the scrolling or panning effect, the start position for the data or its address is changed for each raster scan when the processor 17 clears and reloads the FIFO 39. Thus, the entire sequence, beginning with the vertical blanking period, is repeated for each vertical retrace of the raster display. Different pointers or addresses for window transitions are loaded into the FIFO for each raster scan. This produces the panning or scrolling effect and permits the display windows to be easily moved and modified.

The static pixel data is present at the output of the pixel multiplexer if the static pixel data is non-zero and overlay mode is selected, or if underlay mode is selected and the dynamic pixel data is zero. The dynamic pixel data is present at the output of the multiplexer if overlay mode is selected and the static pixel data is zero, or if underlay mode is selected and the dynamic pixel data is non-zero. The selection of dynamic pixel data or static pixel data is made on a pixel-by-pixel basis.

The pixel multiplexer 40 performs several functions required for hardware pixel panning and format conversion. First, the pixel multiplexer 40 reroutes the four byte lanes of the "primary" display plane from the VRAM serial output registers to the RAMDAC 42 to achieve a pixel offset of zero, one, two, or three pixels within a specified window. In a system that supports the display of four bit pixels at 128 MHz, the PIXEL MUX 40 would accept 8-4 bit pixels at 16 MHz and output the data at 32 MHz. If a four bit display mode is enabled, the pixel multiplexer 40 unpacks the pair of four bit pixels stored in each byte and converts it to a stream of eight bit values that the RAMDAC can accept at 32 MHz and also provides pixel offsets of zero, one, two, three, four, five, six, or seven pixels within the specified window. The static pixel data is present at the output of the pixel multiplexer if the static pixel data is non-zero and the overlay mode is selected and the dynamic pixel data is zero. The dynamic pixel data is present at the output of the multiplexer if the overlay mode is selected and the static pixel data is zero, or if the underlay mode is selected and the dynamic pixel data is non-zero. The selection of dynamic pixel data or static pixel data is made on a pixel-by-pixel basis.

Figure 3:
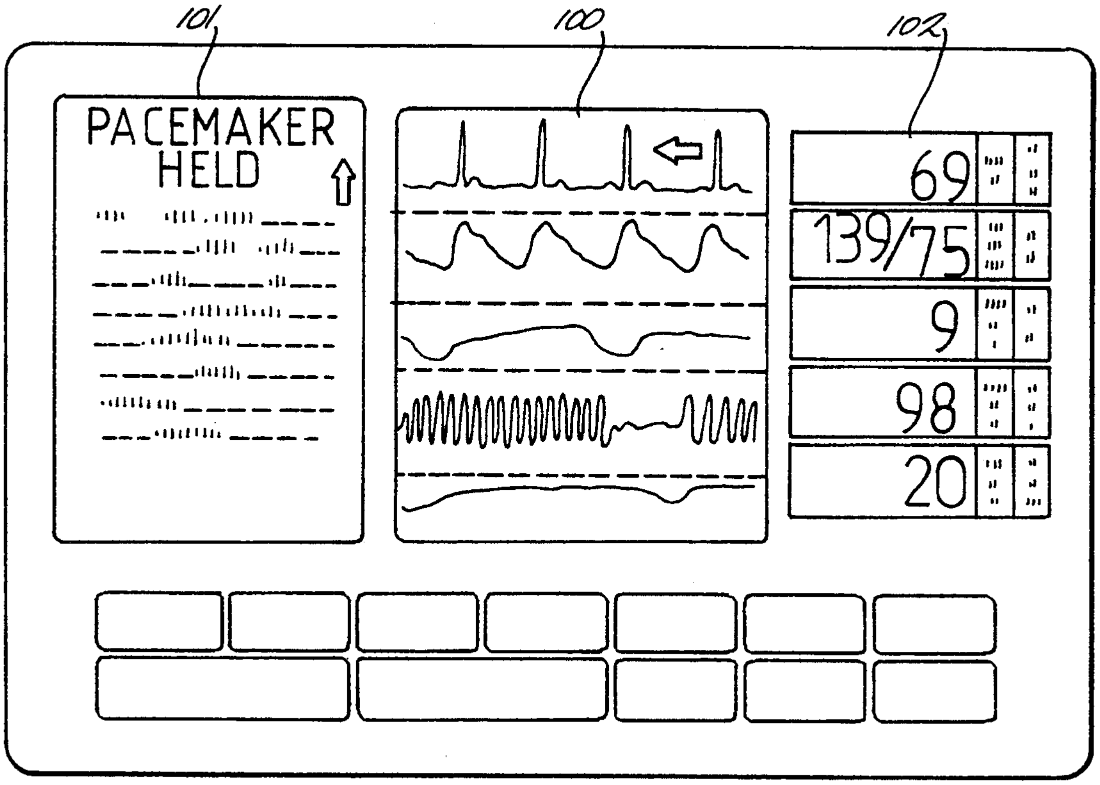
FIG. 3 schematically illustrates one application of the invention to a medical monitoring apparatus.

While the video system according to the present invention has many applications, one is in monitoring cardiac patients as shown in FIG. 3. For example, one display window 100 may show ECG and blood pressure waveforms panning across the screen in real time, that is, about 25 mm. per second. A second window 101 could show respiratory waveforms instructions to operating personnel scrolling at about 5 mm. per second. A third window 102 could be a stationary window showing vital signs. This particular application is intended to be exemplary only, it being understood that the invention has many other applications as well.

Those skilled in the art will appreciate that in the medical application, the data to be displayed would be obtained by an acquisition device connected to the patient by means of electrodes or sensors. Typically, the acquisition module would convert this information to digital form, which would then be used by the main processor to generate signals representative of ECG lead data, blood pressure, and the like. These signals are provided to the video processor by the system bus interface 12 for loading and storage in the VRAM banks 30, 31 and 32 and loading the address data into FIFO 39.

FIG. 4 shows the FIFO data word format. The data stored in the FIFO is used to control the display windowing. One FIFO entry is used to control one window transition and the data that will be displayed on the display raster pattern until the next window transition. The following is a summary of each data field:

MD (1 bit) is used to select if the data displayed in a window will be 8 bits or 4 bits. If 8 bit data is selected then one 32 bit data word in memory will contain data for 4 pixels. If 4 bit mode is selected then one 32 bit data word in memory will contain data for 8 pixels. Four bit data will be displayed at twice the pixel rate of eight bit data. Valid values are o (4 bit mode) or 1 (eight bit mode).

QPTRANS (8 bits) is used to select the position in a horizontal raster scan line that a window transition will occur. A value of 0 indicates that the window starts on the left edge of the display. As the values increase the window position moves to the right on the display. Valid range is 0 to 255.

OL (1 bit) is used to select if the static plane is to be used as an overlay plane or an underlay plane. If overlay is selected then a nonzero value in the static plane will be displayed over the dynamic plane. If underlay is selected then a nonzero value in the dynamic plane will be displayed over the static plane. Valid values are 0 or 1.

VBNK (2 bits) is used to select which dynamic plane is to be displayed. Valid values are 0 to 2.

VROW (9 bits) is used to output as the row address to the selected dynamic plane during the VRAM memory to serial output register transfer cycle. Valid range is 0 to 511.

VCOL (9 bits) is used to output as the column address to the selected dynamic plane during the VRAM memory to serial output register transfer cycle. Valid range is 0 to 511.

PIXTAP (3 bits) is used to select the pixel output order from the 32 bit dynamic plane. This is used to achieve a smooth panning data effect on the display. Valid range is 0 to 3 for 8 bit mode and 0 to 7 for 4 bit mode.

While a FIFO is shown in the drawings, other types of memory devices can also be used so long as the information described above as comprising the FIFO data word can be written and read in real time. One such device is a dual port RAM in which the data can be written and read through two independent ports. In the case of a dual port RAM, address information to the dual port RAM will be required when the data is read or written, since the data can be accessed from any location in the RAM. In any case, midline scan reload is possible, that is, any point in the VRAM memories can be accessed and displayed in real time so that it is possible to switch from one location in the VRAM, to another in the middle of a line of raster scan, thereby permitting a transition from one window to another.

The components employed in the best current mode of the invention and their methods of operation are all well-known inn the art. However, for clarity and completeness, the following parts list is provided:

| Component | Part No. | Qty. | Manufacturer |
|---|---|---|---|
| System bus interface 12 | SN74ACT2440 | 1 | Texas Instruments |
| | SN74BCT2420 | 2 | Texas Instruments |
| Processor 17 | TMS 34020A Graphics processor | 1 | Texas Instruments |
| Memory decoder 18 | MACH 210-15 CMOS Programmable Logic | 2 | Advanced Micro Devices |
| DRAM 27 | TMS44C256 Dynamic RAM | 8 | Texas Instruments |
| Overlay VRAM 28 | TMS44C251 Video RAM | 4 | Texas Instruments |
| VRAM BANKφ 30 | TMS44C251 Video RAM | 8 | Texas Instruments |
| VRAM BANK1 31 | TMS44C251 Video RAM | 8 | Texas Instruments |
| VRAM BANK2 32 | TMS44C251 Video RAM | 8 | Texas Instruments |
| Static RAM 34 | TMS44C251 Video RAM | 8 | Texas Instruments |
| Memory controller 36 | A1240-1 Field Programmable Gate Array | 1 | Actel |
| ARBT 37 | MACH 110-15 CMOS Programmable Logic | 1 | Advanced Micro Devices |
| FIFO 39 | IDT7203525 2K × 9 FIFO | 4 | Integrated Device Technology |
| Pixel MUX 40 | A1280-1 Field Programmable Gate Array | 1 | Actel |
| RCA Buffer 41 | IDT74FBT2841B 10 Bit Memory Latch | 2 | Integrated Device Technology |
| RAMDAC 42 | BT459KPF135 RAMDAC | 1 | Brooktree |

Those skilled in the art will appreciate that the foregoing parts list employed in the best current mode of the invention is not intended to be limiting and that other equivalent components or combinations of components may be employed without deviating from the invention. Accordingly, while only a single embodiment of the invention has been illustrated and described, it is not intended to be limited thereby, but only by the scope of the appended claims.

I claim:

1. A windowing control for a video display having raster means and raster scanning means for performing a raster scan and for displaying data in at least one window in said raster means, the window being defined by window transitions on said raster means, said windowing control including:

programmed control means, first memory means for storing data to be displayed in said at least one window defined on the raster means, second memory means for storing addresses in the raster means of said window transitions and the data stored in the first memory means to be displayed in said at least one window, said control means including memory control means for comparing the position of the raster scan to the next window transition stored in the second memory means and for initiating the transfer of data from said first memory means to the raster means when the raster scanning means reaches the next window transition, said control means being programmed to load data to be displayed into said first memory means and to write new addresses into said second memory means after the transfer of data from said first memory means to said raster means whereby the position of the data within said at least one window has the appearance of horizontal or vertical displacement.

2. The windowing control set forth in claim 1 and including pixel multiplexing means coupled to receive the data from said first memory means and said addresses from said second memory means for mapping the data from the first memory means on the raster means.

3. The windowing control set forth in claim 2 wherein said data to be displayed in said window is stored in said first memory means in a digital format, and digital-to-analog conversion means coupled between said pixel multiplexing means and said raster means for changing said data to be displayed in said windows from digital to analog form.

4. The windowing control set forth in claim 1 wherein said first memory means including means for storing data to be displayed in a plurality of windows, each window being defined by transition points on said raster means, said second memory means including means for storing the addresses of the data for each of said windows and the transitions between said windows.

5. The windowing control set forth in claim 4 and including third memory means for storing data defining the outline of a plurality of windows to be displayed, the second memory means also storing the addresses for each window of said plurality of windows.

6. The windowing control set forth in claim 4 and including pixel multiplexing means coupled to receive the data from the first memory storage means and the addresses from the second memory means for mapping the data from the first memory means on the raster means.

7. The windowing control set forth in claim 4 wherein said control means includes processor means for loading data into said first and second memory means and memory controller means for initiating the transfer of data from said first memory means.

8. The windowing control set forth in claim 1 wherein said first memory means includes first means for storing data to be displayed in a first window defined in the raster means and second means for storing data to be displayed in a second window in said raster means, said second memory means also for storing addresses in the raster means of transitions of said first and second windows, said memory control means being programmed to initiate the transfer of data from said first means for display in a first window of the raster means when the first window transition is reached by said raster scanning means and to transition to the transfer of data from the second means for display in a second window in the raster means when the second window transition is reached.

9. The windowing control set forth in claim 8 wherein said first memory means comprises a plurality of video RAMs.

10. The method of controlling the display of data in a window on a raster including a raster scanning means having a vertical trace, the window being defined in the raster by window transitions, including the steps of:

loading image data to be displayed into a first memory means, clearing previously stored window transition in the raster from a second memory means, loading new window transition and image data addresses in the raster into said second memory means, comparing the position of the raster scanning means to the window transition addresses stored in the second memory means, transferring data to be displayed in the window from the first memory means to raster scanning means when a window transition address is reached by the raster scanning means, displaying the data in a window on the raster in accordance with window transition addresses stored in said second memory means, completing said vertical trace of said raster scanning means, clearing the window transition addresses from the second memory means after the data has been displayed in a window in accordance with a window transition address, loading new window transition addresses into said second memory means after the window transition addresses have been cleared, and initiating the transfer of data from said first memory means for display according to new addresses stored in said second memory means so that there is the appearance of relative movement of said window on said screen or said data within the window in which it is displayed.

11. The method set forth in claim 10 and including the steps of transferring the data to be displayed in the window from the first memory means in seriatum, and reloading into said first memory means new data to be displayed in the window after the transfer of data therefrom.

12. The method set forth in claim 11 and including the steps of loading data to be displayed in a first window in a first portion of the first memory means and data to be displayed in a second window in a second portion of the first memory means, loading into the second memory means for each vertical raster trace new addresses for the data to be displayed in each window and the transitions in the raster trace for the windows.

13. The method set forth in claim 12 and including the steps of multiplexing said data from the first and second portions of the first memory means for serially providing the data for each line of the raster trace.

14. A windowing control for a video display having raster means and raster scanning means, said windowing control including:

programmed control means, first memory means for storing data to be displayed in a first window defined on the raster means at a first location and for storing data to be displayed in a second window defined on the raster means at a second location, second memory means for storing the addresses in the raster means of window transitions and the data to be displayed in the first and second windows, said control means being programmed (i) to load data to be displayed in the first window in the first area of the first memory means; (ii) to load data to be displayed in the second window in the second area of the first memory means; (iii) to load into the second memory means the addresses of the window transitions and the data to be displayed in the first and second windows; (iv) to compare the position of the raster scanning means to the next window transition and to initiate the transfer of data from the area of said first memory means for display in the first window in accordance with the address thereof in said second memory means when the raster scanning means is at the transition of the first window; (v) to transition to the second area of the memory for display in the second window in accordance to the address thereof in the second memory means when the raster scanning means is at the second window transition; and (vi) to write new address data into said second memory means; whereby the position of the data within at least one of said windows has the appearance of panning or scrolling.

15. The windowing control set forth in claim 14 wherein said control means includes processor means for loading data into said first and second memory means and memory controller means for initiating the transfer of data from first memory means in accordance with the window transition addresses in said second memory means.

16. The windowing control set forth in claim 15 wherein said processor means is programmed to load new address data into said second memory means as previously loaded address data is being transferred therefrom.

17. The windowing control set forth in claim 16 wherein said control means is programmed to write new address data into said second memory means for each complete raster scan.

18. The windowing control set forth in claim 14 and including pixel multiplexing means coupled to receive the data from said first memory means and said addresses from said second memory means for mapping the data from the first memory means on the raster.

19. The method of controlling the display of data in windows defined by transitions on a raster means having raster scanning means, including the steps of:

loading into a first area of a first memory means image data to be displayed in a first window in the raster means and data to be displayed in a second window in a second area of the first memory means, loading into a second memory means addresses in the raster means for the window transitions and the data to be displayed in the first and second windows, comparing the position of the raster scanning means to the address of the window transitions stored in the second memory means, and transferring data to be displayed in the first window from the first area of the first memory means to said raster means when a window transition of the first window is reached, displaying the data in a first window in the raster means in accordance with addresses thereof stored in said second memory means, transferring data to be displayed in the second window from the second area of the first memory means when a window transition of the second window is reached, displaying the data from the second area of the first memory means in the second window in the raster means in accordance with the addresses thereof in the second memory means.

20. The method set forth in claim 19 and including the steps of:

completing a vertical trace of said raster, clearing the second data storage means, loading new addresses into said second memory means after the completion of the vertical trace of said raster scanning means, and initiating the transfer of data from said first data storage means for display according to new addresses stored in said second data storage means so that there is the appearance of relative movement of said data within the window in which it is displayed.

21. The method set forth in claim 20 and including the steps and loading new data to be displayed into said first memory means after the transfer of data therefrom.

22. The method set forth in claim 20 and including the steps of loading new addresses for the data to be displayed in each window and the transition points in the raster trace for said windows in the second memory storage means for each vertical raster trace.

23. The method set forth in claim 19 and including the steps of loading new addresses for the data to be displayed in each window and the transition points in the raster trace for said windows in the second memory means for each vertical raster trace.

24. A windowing control for a video display having raster means and raster scanning means wherein the windows are defined by transitions in the raster means, said windowing control including:

programmed control means, first memory means for storing data to be displayed in first and second windows defined on the raster means, second memory means for storing the addresses in the raster means of the data to be displayed in said first and second windows and the addresses of the transition of said windows, said control means being programmed to load data to be displayed into said first memory means and to compare the position of the raster scanning means with the next window transition in the second memory means and for initiating a transfer of data from said first memory means to said display for the first window when the raster scanning means reaches a transition of the first window and for initiating a transfer of data from said first memory means to said display for the second window when the raster scanning means reaches a window transition of the first window and to write new address data into said second memory means as said data is being displayed.

25. The windowing control set forth in claim 24 wherein said control means is programmed to write new address data into said second memory means for each complete raster scan.

26. The windowing control set forth in claim 25 wherein said control means includes processor means for loading data into said first and second memory means and memory controller means for comparing the raster scan position with the next window transition stored in said initiating the transfer of data from said first memory means.

27. The windowing control set forth in claim 26 and including pixel multiplexing means coupled to receive the data from said first memory means and said addresses from said second memory means for mapping the data from the first memory means on the raster.

28. A windowing control for a video display including a screen and raster means for scanning the screen, said windowing control including programmable control means, first memory means for storing graphics and text to be displayed in at least one window defined on the screen, second memory means for storing addresses in the raster means of the data to be displayed in the at least one window and the window transitions which define the margins of the window on the screen, the control means being programmed to compare the raster scan position with the next window transition stored in the second memory means and to initiate a transfer of data from the first memory means to the display when the raster scan reaches the next window transition and to write new address data into the second memory means for each complete raster scan whereby the data displayed within the at least one window can be panned or scrolled.

29. The method of controlling the display of data in at least one window defined by window transitions on a display screen raster, including the steps of loading images to be displayed into first memory means, clearing previously stored addresses from a second memory means, loading into said second memory storage means new addresses in a display screen for the data stored in the first memory means and the window transition into the second memory means, comparing the position of the raster on the display screen to the next window transition stored in the second memory means, transferring data to be displayed in the window from the first memory means and displaying the data on the screen in accordance with addresses stored in the second memory means when the next window transition is reached, completing a vertical raster trace on the display screen, clearing the second data storage means, loading new addresses data and window transitions into the second memory means after the completion of a vertical raster trace, and initiating the transfer of data from the first memory means for display according to new addresses stored in the second memory means when the next window transition is reached so that there is the appearance of relative movement of the data within the window in which it is displayed.

* * * * *